United States Patent [19]

Inoue

[11] Patent Number: 5,004,295

[45] Date of Patent: Apr. 2, 1991

[54] POCKET IN AUTOMOTIVE SEAT

[75] Inventor: Nobuhiro Inoue, Akishima, Japan

[73] Assignee: Tachi-S Co., Ltd., Tokyo, Japan

[21] Appl. No.: 447,610

[22] Filed: Dec. 8, 1989

[51] Int. Cl.⁵ .................................................. A47C 7/62
[52] U.S. Cl. ..................................... 297/191; 297/188
[58] Field of Search ............... 297/191, 188, 218, 224, 297/225, 182, 146

[56] References Cited

U.S. PATENT DOCUMENTS

| 210,487 | 12/1878 | Bovey | 297/191 X |
| 2,126,331 | 8/1938 | Humphrey | 297/191 X |
| 2,652,882 | 9/1953 | Kotler | 297/191 X |
| 3,088,771 | 5/1963 | Weigle | 297/191 X |
| 3,479,085 | 11/1969 | Weinstein | 297/191 X |
| 4,466,659 | 8/1984 | Carpentier et al. | 297/191 |
| 4,896,919 | 1/1990 | Muraishi et al. | 297/191 X |

FOREIGN PATENT DOCUMENTS

| 712556 | 7/1954 | United Kingdom | 297/191 |
| 1476493 | 8/1974 | United Kingdom | 297/188 |

Primary Examiner—Jose V. Chen
Attorney, Agent, or Firm—Oldham and Oldham Co.

[57] ABSTRACT

A pocket provided in the seat back of an automotive seat, which comprises a pocket frame having plural studs and a pocket trim cover assembly. The pocket trim cover assembly is secured by said pocket frame to the back board of the seat back. Hence, the outer appearance of the seat back is aesthetically improved.

10 Claims, 2 Drawing Sheets

POCKET IN AUTOMOTIVE SEAT

BACKGROUND OF THE INVENTION

1. Field of the Invention

The present invention relates to a pocket equipped with an automotive seat, and particularly to a pocket provided on a back board of a seat back of the seat.

2. Description of Prior Art

There has been widely used a pocket in the seat back of an automotive seat in a car or bass to enable a passenger to contain a magazine, map or some small articles therein. Conventionally, the pocket is provided on the back board of the seat back and formed by a net.

Such net pocket is, however, poor aesthetically in appearance. Further, the net exposes an article therein to view externally, which results in a more poor appearance of the pocket.

SUMMARY OF THE INVENTION

It is a first purspose of the present invention to provide a pocket in an automotive seat which is improved in outer aesthetic appearance.

In achievement of such purpose, in accordance with the present invention, a pocket trim cover assembly is secured to a pocket frame via plural studs of the frame and a resultant pocket pouch unit is fixedly attached to a back board fixed to the rear side of seat back of the seat, whereby is attained the pocket in the automotive seat.

Accordingly, in contrast to the foregoing prior art net-type pocket, is greatly improved the outer aesthetic apperance of the seat back, and articles in the pocket are not exposed to view, thus adding to the aesthetical improvement of the outer appearance of the seat back.

It is a second purpose of the present invention to avoid creation of creases and slacks on the pocket, when some articles are contained therein.

To this end, the pocket trim cover assembly is formed in a three-layer lamination structure, and affixed over the pocket frame via plural studs, excepting its upper edge. Thus, such three-layer structure of the pocket trim cover assembly is not prone to crease or slack creation, which is pronounced by the shape-retaining effect of the Pocket frame.

It is a third purpose of the present invention to provide a rear-side central pocket on the central wall of the seat back and a pair of lateral pockets on respective both lateral walls of the seat back.

To this end, the pocket frame is formed in a generally U-shaped configuration, having a horizontal frame section and a pair of vertical lateral frame sections, such as to encompass the central wall and both lateral walls of the back board, and the pocket trim cover assembly is secured to the back board by such pocket frame, whereby are defined a central pocket on the central wall of the back board, and a pair of lateral pockets on the respective both lateral walls of the back board.

Accordingly, a number of articles may be contained in each of those three pockets, presenting thus a multipurpose and useful pocket.

DETAILED DESCRIPTION OF PREFERRED EMBODIMENT OF THE INVENTION

Figure 1:
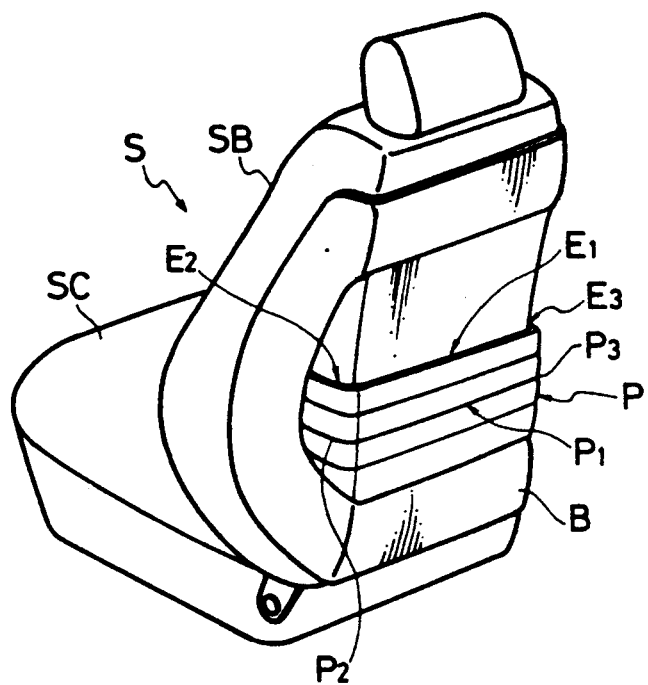
FIG. 1 is a perspective view of an automotive seat provided with a pocket in accordance with the present invention.

Referring to FIG. 1, is illustrative an automotive seat (8) which is provided with a pocket (P) in accordance with the present invention.

The seat (S) is basically composed of a seat back (SB) and a seat cushion (SC).

Designation (B) represents a back board which is fixedly mounted at the rear side of the seat back (SB) such that the back board (B) expands not only at the rear surface of the seat back (SB) but also over both lateral walls of the same. As shown, the back board (B) is formed with a recessed area (11, 12, 13) and a plurality of apertures (14a)(14b)(14c) as will be described in detail. Preferably, the back board is a unitary board made of a synthetic resin material.

The pocket (P) is defined at that recessed area of the back board.

Figure 4:
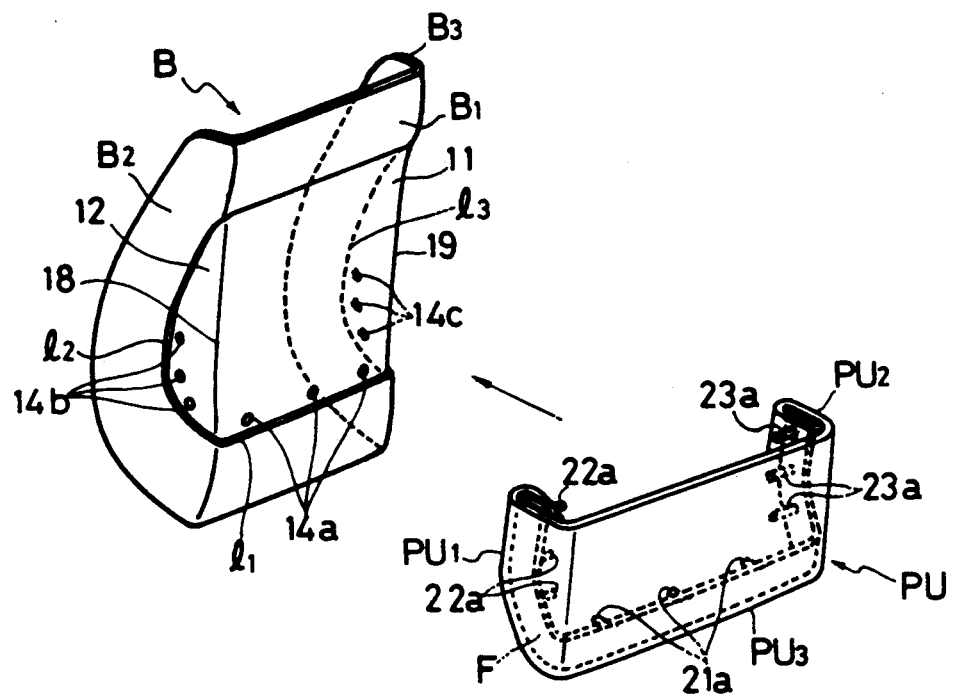
FIG. 4 is a perspective view of a back board and a resultant pocket pouch unit, explaining that the latter is to be secured to the former.

As best shown in FIG. 4, the backboard (B) is formed in a U-shaped configuration in section such as to compass the rear wall and both lateral walls of the seat hack (SB), havIng a central body portion (B1) and a pair of lateral bent portions (B2)(B3) each being integrally formed at the respective both edges of the central body portion (B1). The central body portion (B1) has a central recessed section (11) formed therein. The two lateral bent portions (B2) (B3) have a left-side recessed portion (12) and rightside recessed portion (13) formed respectively. Designations (14a)(14b)(14c) in this figure denote a central set of plural securing holes (14a) formed in the lower region of the central recessed section (11) adjacent to the associated stepped line (S1) thereof, a left-side set of plural securing holes (14b) formed in the lower half region of the left-side recessed portion (12) adjacently along the curved stepped line (S2), and a right-side set of plural securing holes (14c) formed in the lower half region of the right-side recessed portion (13).

It should be noted that those sets of plural securing holes (14a)(14b)(14c) are arranged in a manner conforming to the mating plural studs (21a, 22a, 23 a) of a pocket frame (F) as will be explained later.

Figure 2:
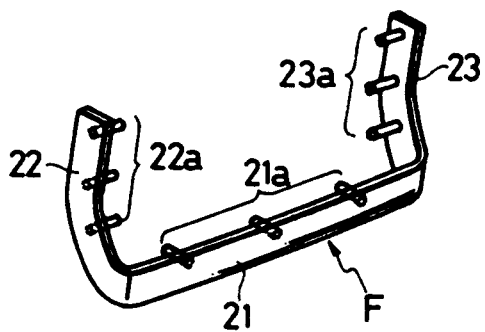
FIG. 2 is a perspective view of a pocket frame of the pocket as in FIG. 1.
Figure 3:
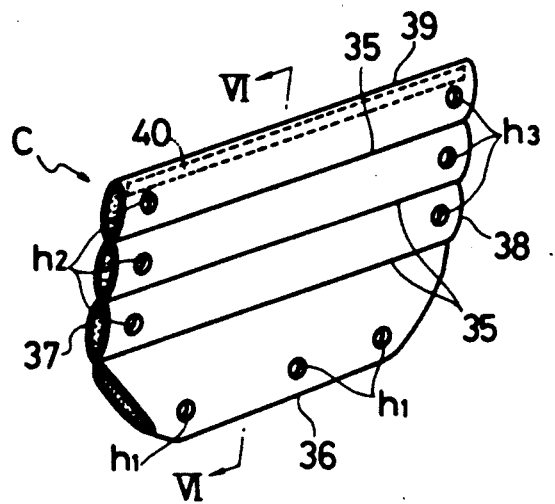
FIG. 3 is a perspective view of a pocket trim cover assembly of the same pocket.

Referring now to FIGS. 2 and 3, there are shown a pocket frame (F) and pocket trim cover assemby (C) in which it is to be understood that the latter (C) Is securely affIxed over the former (F) to thereby form a pocket pouch unit which is securely attached to the recessed portions (11, 12, 13) for defining the pocket (P) rearwardly of the seat back (SB), which will anyhow become apparent from a further descriptions below.

FIG. 2 shows the pocket frame (F) of a generally U-shaped configuration which conforms to the lower half part of the recessed areas (11, 12, 13) of the back board (B); in other words, the pocket frame (F) is formed in a shape wich extends along the corresponding stepped lines (S1)(S2)(S3). As such, the frame (F) comprises a horizontal frame section (21) and a pair of left-side and right-side vertical frame sections (22)(23), such that the two vertical frame sections (22)(23) are both formed in such a forwardly arced manner that conforms to the respective lower halves of the two convexly curved stepped lines (S2) (S3). As shown, a central set of plural studs (21a) is formed at the inner wall of the horizontal frame section (21), whereas left-side and right-side sets of plural studs (22a)(23a) are respectively formed at the inner walls of the two corresponding vetical frames (22)(23), with the studs (22a)(-23a) faced towards each other.

Preferably, the pocket frame (F) is made of a synthetic resin material having a relatively elastic property.

Figure 6:
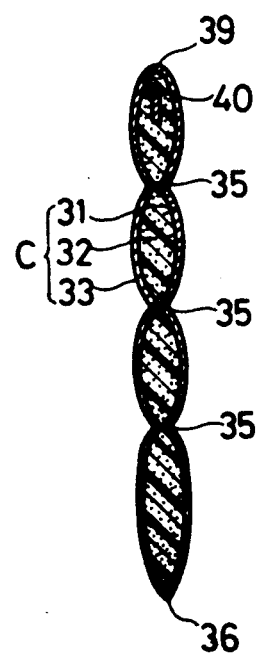
FIG. 6 is a sectional view taken along the line VI—VI as in the FIG. 3.

FIG. 3 shows the pocket trIm cover assembly (C) which is formed at a larger dimensions than that of the pocket frame (F), and, as best seen in FIG. 6, comprises a covering surface layer (31), a slab padding (32), and a back cloth (33). Preferably, the covering surface layer (31) is made of a woven fabric, natural or synthetic leather, the padding (32) is made of a woven fabric, or the like. Those three layers (31)(32)(33) are sewn together by a suitable horizontal sewing method to defIne such plural quiltings (35) therein, which extend in a spaced-apart and parallel relationship with one another in a direction transversely of the pocket trim cover assembly (C). Within the upper end part (39) of the packet trim cover assembly (C), is embedded an elastic rubber band (40) such that it extends along the longitudinal direction of upper end part (39) for a purpose to be stated later.

The pocket trim cover assembly (C) is further formed with a central set of securing holes (h1) at the lower end part (36) thereof, and a pair of leftside and right-side securing holes (h2)(h3), respectively, at both lateral end parts (37)(38) thereof. All those securing holes (h1)(h2)(h3) are so adapted that the foregoing three sets of studs (22a)(22b)(22c) are inserted through the corresponding set of the holes (h1)(h2)(h3) and secured thereat, and therefore, the holes (h1)(h2)(h3) are disposed in such an arrangement that conforms to that of the mating studs (22a) (22b)(22c) of the pocket frame (F).

Figure 5:
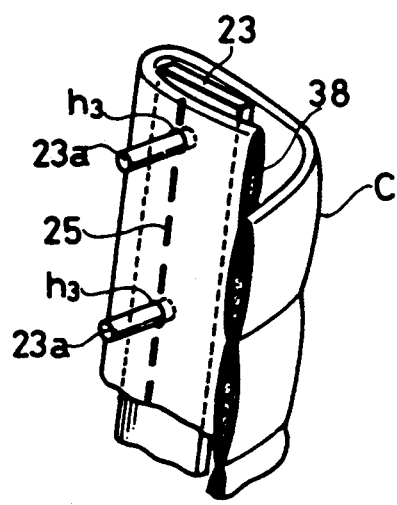
FIG. 5 is a partially broken perspective view of the resultant pocket pouch unit, which helps to explain how the pocket pouch unit is to be assembled from the pocket frame and Pocket trim cover assembly.

The manner in which the pocket trim cover assembly (C) is affixed over the pocket frame (F) is such that both lateral end parts (37)(38) are respectively folded inwardly around the two vertical lateral frame sections (22)(23) of the pocket frame (F), and then as understandable from FIG. 5, the corresponding studs (22a)(-23a) of the frame (F) are inserted through the respective securing holes (h2)(h3) such as to project therefrom, after which, those two lateral end parts (37)(38) are fixed to the respective inner walls of the two vertical lateral frame sections (22) (23) by means of staPle-like fixing members (25), further after which, the lower end part (36) of the pocket trim cover assembly (C) is folded upwardly around the horizontal frame section (21) of the frame (F), and the corresponding set of studs (21a) is inserted through the mating set of securing holes (h1) such as to project therefrom. With the lower end part (36) the pocket trim cover assembly (C) being fixed to the inner wall of the horizontal frame section (21) by means of the fixing members (25), there is produced a pocket pouch unit (PU), as seen in FIG. 4, which is now ready to be securely attached to the back board (B).

Now, referring to FIG. 4, the thus-assembled unit of pocket pouch body (PU) is to be attached to the given portion of the back board (B) as follows.

Both lateral ends (PU1)(PU2) of the pocket pouch unit (PU) are pulled outwardly away from each other so a to widen the opening between the two ends enough to facilitate the insertion of the right- and left-side sets of studs (22a)(23a) into the corresponding sets of securing holes (14b)(14c) of the back board (B). Then, as indicated by the arrow, the pocket pouch unit (PU) is attached to the back board by inserting all the sets of studs (21a)(22a)(23a) through the respective sets of securing holes (14a)(14b)(14c), whereupon, as shown in FIG. 1, the pocket pouch unit (PU) encompasses the lower half of the recessed area (11, 12, 13) while being fixedly attached thereto by means of push nuts or other fastening means being engaged fixedly to the respective forward free ends of those studs (21a)(22a)(23a), to thereby prevent removal of the pocket pouch unit (PU) from the back board (B), whereupon as a final result, is defined the pocket (P) at the back board (B).

It is noted that the upper edge (39) of the pocket trim cover assembly (C) is resiliently urged to contact with the central, left-side and right-side walls of the three recessed poritons (11)(12)(13) by virtue of the rubber band (40), so that normally the entry openings (E1)(E2)-(E3) are in a generally closed state.

As can be seen in FIG. 1, the back board (B) with the pocket (P) thereon is fixed to the rear side of the seat back (SB).

Viewing FIG. 1 again, the pocket (P) is divided into three pockets: A central pocket (P1), a left-side lateral pocket (P2), and a right-side lateral pocket (P3). The reason is that the upper edge (39) of the pocket trim cover assembly (C) encompsses the hack board (B), turning around both corners (18) (19), whereby are defined three entry openings (E1) (E2)(E3), respectively, at the central, right-side lateral and left-side lateral walls respecively of the three recessed portions (11)(12)(13), as seen from FIG. 1 and FIG. 4 in both.

From the above descrIptions, it is appreciated in accordance with the present invention that the following advantages are found:

(1) Since the pocket trim cover assembly (C) is supported by the frame (F), and further, those two elements are fixed on the back board (B), the outer contour of the pocket (P) is not so deformed as to impair its appearance in view of the shape retaining effect, and the article in the pocket (P) is not exposed to view due to the trim cover assembly (C) used, instead of the prior-art net-type pocket. Thus, even when the pocket (P) contains some articles, the outer appearance thereof is kept good in aesthetic aspect.

(2) One single sheet of pocket trim cover assembly (C) defines three pockets (P1)(P2)(P3) on the back board (B). This is quite useful and effective for multi-purpose storage of many small articles.

(3) The three-layer lamination structure of the pocket trim cover assembly (C) are effective in avoiding formation of undesired creases or slack, in cooperation of the shape-retaining effect of the frame (F).

While having described as above, it should be understood that the present invention is not limited to the illustrated embodiment, but any other modifications, replacements and additions may structurally be possible without departing from the scopes and spirits of the appended claims.

I claim:

1. A pocket in an automotive seat, in which said seat includes a seat back and a back board securely attached to a rear portion of said seat back, said pocket comprising:
   a pocket frame having a plurality of studs integrally formed therewith, said studs being fixed to said back board; and
   a pocket trim cover assembly which is securely attached by said pocket frame to said back board;
   wherein said back board is formed in a generally U-shaped configuration in section, such as to encompass the central and both lateral walls of said rear portion of said seat back, and comprises a central wall and a pair of lateral walls, and has formed therein, a plurality of holes through which are inserted said plurality of studs of said pocket frame;
   wherein said pocket frame is formed in a generally upright U-shaped configuration, such as to encompass a central and both lateral walls of said back board, and
   wherein said pocket trim cover assembly is fixedly secured between said back board and said pocket frame via said studs, whereby there are defined a central pocket at said central wall of said back board, and a pair of lateral pockets respectively at said both lateral walls of said back board;
   said socket trim cover assembly being formed with a plurality of holes, said plurality of holes being so adapted that said plurality of studs are inserted therethrough, and wherein said pocket trim cover assembly is folded around said pocket frame and secured thereto by means of said studs of said pocket frame and a plurality of fixing means.

2. The pocket according to claim 1, wherein said back board is a unitary board made of a synthetic resin material.

3. The pocket according to claim 1, wherein said back board is formed with a recessed area in its said central wall as well as said both lateral walls, and wherein said pocket trim cover assembly is fixedly secured at said recessed area via said pocket frame.

4. The pocket according to claim 1, wherein said pocket frame comprises a horizontal frame section and a pair of vertical lateral frame sections each being integrally formed with respective both ends of said horizontal frame section, and wherein said pocket frame is to be fixed to said back board such that said horizontal frame section of said pocket frame is fixed to said central wall of said back board by means of said studs, whereas said pair of vertical frame sections of said pocket frame is fixed to respective both lateral walls of said back board by means of said studs.

5. The pocket according to claim 4, wherein said back board has, formed therein, a plurality of holes through which are inserted said plurality of studs of said pocket frame.

6. The pocket according to claim 1, wherein said pocket frame is made of a synthetic resin material with a relatively elastic property.

7. The pocket according to claim 1, wherein said pocket trim cover assembly comprises a surface covering layer, a plate-like foam padding, and a back cloth.

8. The pocket according to claim 1, wherein within said upper end portion of said pocket trim cover assembly, there is embedded an elastic rubber band such that it extends along a longitudinal direction of said upper end portion.

9. The pocket according to claim 1 wherein said pocket from and said trim cover assembly are attached only to the lower portion of said back board.

10. The pocket according to claim 1 wherein said pocket frame comprises a horizontal frame section and a pair of upwardly extending lateral frame sections which extend upwardly in spaced apart relationship from said horizontal frame section each of said frame sections being provided with a plurality of said studs, said studs being adapted to be inserted into corresponding holes formed in said back board.

* * * * *